June 13, 1967 E. A. FROWEIN 3,325,583
INSULATOR FOR PRESSURE GAS-INSULATED FULLY
ENCLOSED SWITCHGEAR APPARATUS
Filed July 21, 1965
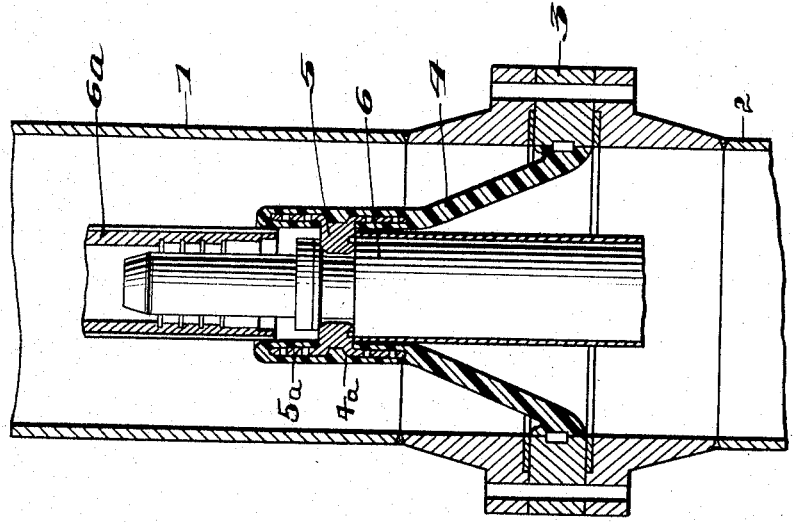
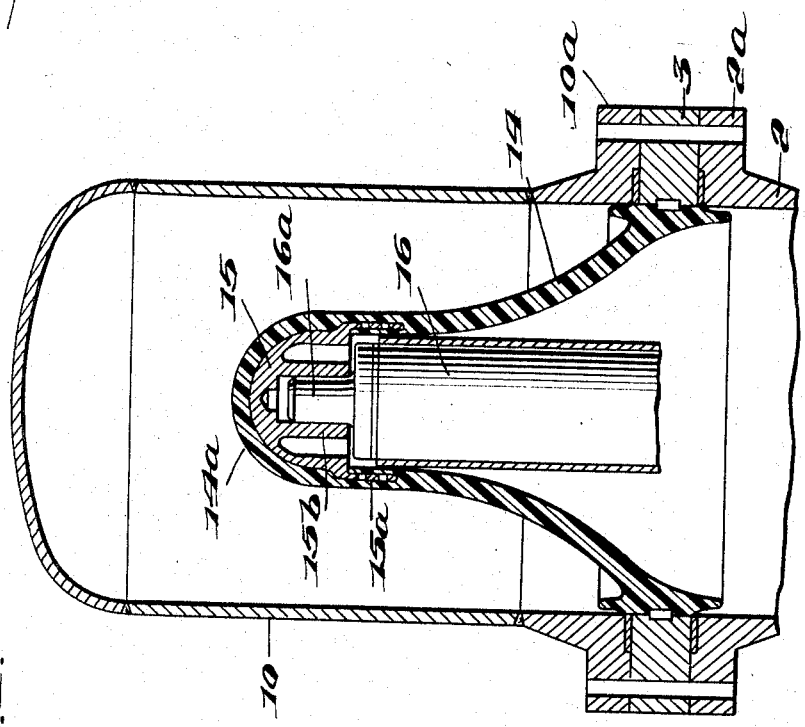
INVENTOR
Egbertus A. Frowein
BY Pierce Scheffler & Parker.
ATTORNEY

United States Patent Office 3,325,583
Patented June 13, 1967

3,325,583
INSULATOR FOR PRESSURE GAS-INSULATED FULLY ENCLOSED SWITCHGEAR APPARATUS
Egbertus A. Frowein, Nussbaumen, Aargau, Switzerland, assignor to Aktiengesellschaft Brown, Boveri & Cie, Baden, Switzerland, a joint-stock company
Filed July 21, 1965, Ser. No. 480,540
Claims priority, application Switzerland, Sept. 6, 1961, 10,320/61
4 Claims. (Cl. 174—20)

This invention relates to an improved construction for an electrical lead-through or duct for use within pressure gas-insulated, fully enclosed switchgear apparatus, and is a continuation-in-part of application Ser. No. 221,195, filed Sept. 4, 1962.

In the case of fully enclosed switchgear apparatus provided with pressure gas insulation, the various components having their particular functions such as, for example, bus bars, disconnectors, power switches, etc., are housed for the most part in separate gas tight compartments of a tubular casing. These compartments are electrically connected with each other by means of lead-throughs or ducts in the following text called bushings which are used at the same time as supports for the corresponding mechanical parts, and as bulkheads for the gas.

For higher voltages, it is customary to use condenser bushings provided with a great number of stress equaliser electrodes to ensure a uniform electrical surface load. Condenser bushings for these purposes are expensive, however, and require considerable space. By means of the present invention, it becomes possible to eliminate these condenser bushings and therefore to save the appreciable costs of their numerous stress equalising electrodes.

In accordance with the invention, an improved insulator or structure is used as a bushing and is characterized by a hollow body of casting resin having a tapered configuration with a conductive metallic protector element cast into the top portion of the insulator, the parts of the electrical conductor which have to be coupled and which are for mechanical reasons of an electrical unfavorable shape being arranged within that conductive metallic protector element of the insulator. The tapered hollow body of casting resin which serves as the insulator is principally so formed that a practical uniform electrical surface load is ensured. Depending upon the shape of the electrical field in which this body is used, it may have various configurations, e.g. a straight wall in the form of a cone frustum or the insulator wall may be curved such as to produce a horn or bellshaped configuration.

The invention will become more clearly understood from the following detailed description of two embodiments thereof and from the accompanying drawings in which:

FIG. 1 is a view in central vertical section of a part of an enclosed switchgear unit incorporating a bushing according to the invention and in which the insulator body has a configuration of a cone frustum;

FIG. 2 is also a view in central vertical section of another type of enclosed switchgear unit which incorporates a body according to the invention and which has a configuration of a horn or bell.

With reference now to FIG. 1, which shows a bushing for an enclosed switchgear, 1 and 2 designate the conventional grounded tubular casings of the switchgear containing a compressed gas which are joined together by means of a flanged ring 3. The hollow tapered insulator body in accordance with the invention is indicated at 4 and is seen to have a configuration corresponding generally to a cone frustum and is made of a casting resin. In the illustrated embodiment, the tapered insulator 4 which provides a most favorable distribution of the surface load in this case of the form of the electrical field is secured at its base to the inner peripheral surface of the flanged ring 3 but the ring 3 can also be cast along with the insulator 4 if desired. A tubular metallic protector 5 is located at the top portion of the insulator 4 and is cast-in with the latter, it being noted that the protector element 5 includes oppositely extending flange portions 5a which are cast into the apex portion 4a of the insulator, this apex portion being characterized by cylindrical wall extending parallel with the longitudinal axis of the joined switchgear casing parts 1 and 2. The protector element 5 includes a center wall having a hole and on this center wall are secured the conductor parts established by the conductor part 6b of reduced diameter and as a mechanical support for the latter. The shielding results from the influential effect of the protector element on the electric field in the pressure gas space within the casing part 1, the element serving to influence and control formation of the field to an optimum gradient. At the same time, the presence of the center wall in the protector element 5 enables one in combination with the insulator body 4 and the flanged ring 3 to obtain a gas-tight separation of the two sections of the casing.

A second embodiment of the invention is illustrated in FIG. 2 which shows an arrangement for a terminal bushing. In this embodiment, the insulator 14 has the general configuration of a horn or bell and with the base portion thereof secured to the inner peripheral surface of the ring 3. With a horn or bell-shaped configuration for the insulator, one obtains an equi-voltage gradient on the surface. This results in a very short dimension of the insulator in the axial direction. The metallic protector element 15 at the upper end of insulator 14 is seen to have a hemispherical configuration located within the hemispherical upper part 14a of insulator 14 and with a depending flange portion 15a which is cast in to the wall of insulator 14. Being hemispherical, the protector element 15 is accessible from one side only. From this accessible side, the conductor end 16 is inserted with the pin 16a into a centrally located sleeve portion 15b in the protector element. A conventionally grounded terminal cap 10 filled with a pressurized gas surrounds the bell-shaped insulator element 14 and is provided with a flange portion 10a at the lower end thereof which is clamped to a flanged portion 2a of casing part 2, the flange ring 3 being clamped in place between the flange portions 10a and 2a. As in the embodiment of FIG. 1, the metallic protector 15 serves to influence and shape the electric field in the pressure gas filled space within the terminal cap 10, especially at the sharp edge existing at the junction of the conductor parts 16 and 16a.

In a multiple-phase arrangement, several such tapered insulators in accordance with the invention can be cast together. The apex portions of the tapered insulators can then be arranged either all on the same side, or on both sides distributed towards the ring 3.

I claim:

1. Fully enclosed pressure gas insulated switchgear apparatus comprising a grounded cylindrical outer casing containing a pressurized gas, a cylindrical conductor member located concentrically within said outer casing and along the axis thereof, said conductor member having at least one portion of reduced diameter establishing at least one sharp edge on the conductor, a tapered hollow rounded body of casting resin located concentrically within said outer casing, means securing the radially outer larger diametered portion of said body of casting resin to said outer casing, and an at least partially cylindrical radially-symmetrical metallic protector member cast into the wall of said body of casting resin in the vicinity of the radially inner smaller diametered portion thereof, the cylindrical part of said metallic protector member surrounding said conductor member at said sharp edge thereon and serving to influence and control formation of the electrical field in the pressurized gas space between said sharp edge and said outer casing, said conductor member being supported by said protector member, and the combination of the metallic protector member, the insulator body, the flanged ring and that part of the conductor which is fixed in the metallic protector member forming a gastight bulkhead between the two compartments.

2. Apparatus as defined in claim 1 wherein said protector member includes an annular like portion thereof closely surrounding said reduced diameter portion of said conductor member and cylindrical flanged portions extending in an axial direction in both directions from said annular like portion.

3. Apparatus as defined in claim 1 wherein said protector member has a hemispherical configuration and includes a recess within which the reduced diameter portion of said conductor member is received.

4. Apparatus as defined in claim 1 wherein said tapered hollow body includes a hemispherical head part at the smaller end thereof and said protector member also includes a hemispherical part located within the hemispherical head part of said hollow body, said protector member also including a recess within the hemispherical part which receives said reduced diameter portion of said conductor member.

References Cited

UNITED STATES PATENTS

| 1,740,367 | 12/1929 | Newton. | |
| 1,786,600 | 12/1930 | Coates | 174—75 X |
| 2,967,901 | 1/1961 | Priaroggia | 174—73 |

FOREIGN PATENTS

| 572,284 | 11/1958 | Belgium. |
| 476,408 | 12/1937 | Great Britain. |

LEWIS H. MYERS, *Primary Examiner.*

H. HUBERFELD, *Assistant Examiner.*